(12) United States Patent
Fossion

(10) Patent No.: US 7,724,810 B2
(45) Date of Patent: May 25, 2010

(54) COMMUNICATION INTERFACE AND TESTING METHOD THEREFORE

(75) Inventor: Marc Fossion, Ligny (BE)

(73) Assignee: Alcatel, Paris (FR)

( * ) Notice: Subject to any disclaimer, the term of this patent is extended or adjusted under 35 U.S.C. 154(b) by 1064 days.

(21) Appl. No.: 11/372,129

(22) Filed: Mar. 10, 2006

(65) Prior Publication Data

US 2006/0212918 A1    Sep. 21, 2006

(30) Foreign Application Priority Data

Mar. 18, 2005  (EP)  .................................. 05290616

(51) Int. Cl.
H04B 1/38    (2006.01)
H04L 5/16    (2006.01)

(52) U.S. Cl. ........................ 375/222; 375/219; 375/220; 375/224

(58) Field of Classification Search ................. 375/219, 375/220, 222, 224
See application file for complete search history.

(56) References Cited

U.S. PATENT DOCUMENTS

| | | | |
|---|---|---|---|
| 5,859,894 A * | 1/1999 | Ortiz Perez et al. ........ 379/1.01 |
| 6,452,987 B1 * | 9/2002 | Larsson et al. .............. 375/345 |
| 6,631,178 B1 | 10/2003 | Blackwell et al. | |
| 6,839,383 B1 | 1/2005 | Karnes | |
| 7,599,618 B2 * | 10/2009 | Adam et al. .................. 398/16 |
| 2001/0043675 A1 | 11/2001 | Starr | |
| 2002/0041657 A1 | 4/2002 | Ulanskas et al. | |
| 2003/0095591 A1 * | 5/2003 | Rekai et al. ................. 375/225 |
| 2006/0063525 A1 * | 3/2006 | Hazell ........................ 455/425 |

* cited by examiner

Primary Examiner—Curtis B Odom
(74) Attorney, Agent, or Firm—Harness, Dickey & Pierce, P.L.C.

(57) ABSTRACT

A method for testing a bidirectional communication interface including a transmitter and a receiver in an analogue front-end of a modem, comprising, transmitting a first test signal in a first frequency range with a first amplitude, from the transmitter. The method also includes receiving, at the receiver, a signal in a second frequency range with a first amplitude and transmitting a second test signal in a first frequency range with a second amplitude, from the transmitter. The method further includes receiving, at the receiver, a signal in a second frequency range with a second amplitude and determining a difference value based on the first and second amplitudes of the received signals.

15 Claims, 2 Drawing Sheets

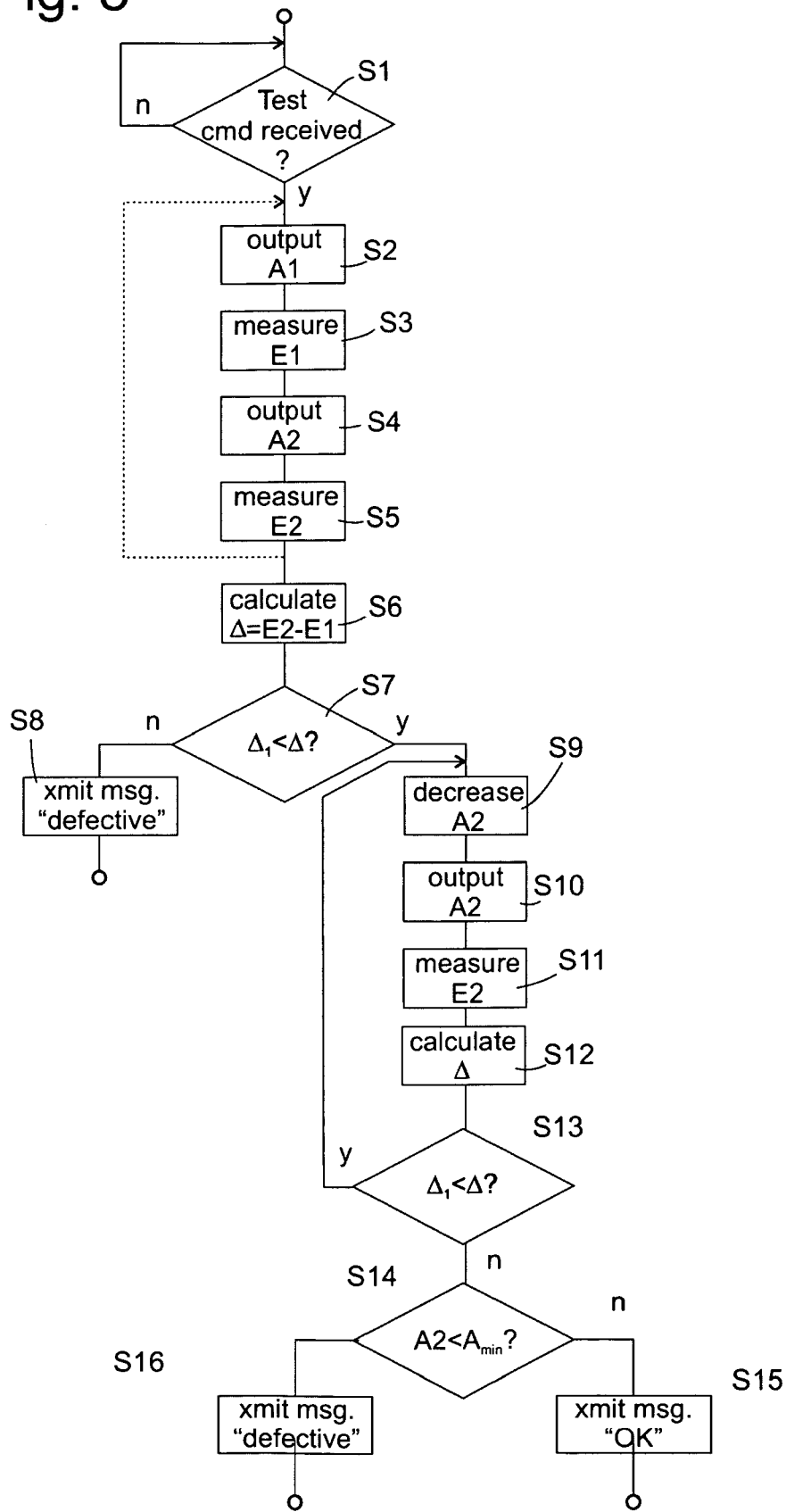

COMMUNICATION INTERFACE AND TESTING METHOD THEREFORE

BACKGROUND OF THE INVENTION

The invention is based on a priority application EP05290616.1 which is hereby incorporated by reference.

The present invention relates to a bi-directional communication interface and to a method for testing it for defects.

A preferred but not exclusive application of the present invention is a DSL (digital subscriber line) modem and a method for testing it. The modem may be part of a digital subscriber line access multiplexer (DSLAM) or of a subscriber's equipment.

Alleged or real failures of DSLAMs operating in the field contribute significantly to the operating cost of a telecommunication network. Since the DSLAMs have to be installed closed to a subscriber's premises, it is not possible to group many of them at a same location. Whenever one of these DSLAMs fails or seems to fail, service personnel has to be sent out to check the DSLAM, involving considerable costs for the operator of the network.

Failures may occur in DSLAMs for various reasons. A frequent cause of failure are their power supply devices. A failure of these is easily detected from a management station of a network to which the DSLAMs are connected, since they cause the complete circuit board of the DSLAM to fail. Other failures which are not so easily detected are single component damages. These occur quite frequently with digital or analog ASICS, since these are active silicon components with a high degree of integration, the transistors of which are sensitive to overvoltages, electromagnetic interference, etc.

Another important cause of failures are line drivers and components associated to these, since they have a high power dissipation, and because they are directly connected to the telephone line (subscriber line), where overvoltages due to lightning may occur.

Another frequent cause of communication problems between DSLAM and subscriber modems are errors in the configuration of ATM and IP layers of the various network components such as switches, routers, and broadband access servers to which the DSLAM is connected on the network side. Such errors can make the DSLAM appear defective, while it is in fact only incorrectly controlled.

Similar communication problems may be caused by the subscriber's modem, if settings in the subscriber's equipment are incorrect.

In particular in the latter cases, it is quite frequent that repair staff is sent to a DSLAM because it seems defective, but in the end, the effort is in vain, because the reason for a failure is somewhere else.

Network operators are of course interested in keeping the number of such visits as low as possible. In order to meet this demand, DSLAMs are severely tested before delivery.

In a conventional pre-delivery test, all XDSL ports of a DSLAM card are connected to a reference impedance of 100 ohms. Then a set of automatic tests carried out by a processor of the DSLAM allows for detection of hardware problems in the DSLAM. As this type of test needs a known reference impedance, it cannot be carried out in the field, where telephone lines are connected to the DSLAM ports, the impedance of which is not known exactly, and on which there may be noise signals of various origins.

A paper by Acterna, LLC, Germantown, Md. entitled "Verification of ADSL Modem Interfaces as per ANSI T1.413 and ITU-T G.992.1" describes a method for testing an ADSL transmitter in which the transmitter is connected to an ADSL line simulator. In the spectrum of DMT carriers that form a conventional ADSL signal, a gap is formed by suppressing one or more carrier frequencies, so that intermodulation noise generated at the suppressed frequency can be observed without background, and a signal-noise ratio at the suppressed frequency or frequencies is obtained from measured power levels of said intermodulation noise and of an unsuppressed DMT carrier to the left or the right of the gap.

The so-called boot self-test, which is conventionally performed by a DSLAM when powered up, allows to detect some hardware problems, mainly in the digital circuitry of the DSLAM. Problems of the analog front-end of the DSLAM and of the subscriber line are not detected. Moreover, the power-up self-test cannot detect problems that arise during operation, because in order to repeat the self-test, the DSLAM would have to be re-booted, which would imply an interruption of service for all users connected to it, which cannot be tolerated.

Another conventional testing method which is useful for testing the communication between the DSLAM and a subscriber's modem implies the use of two protocol simulator circuits. For carrying out this test, the connection between the DSLAM and the subscriber's modem is interrupted using relays placed between the DSLAM and the telephone line, and the DSLAM is connected to the protocol simulator which simulates the subscriber's modem, and the subscriber's modem is connected to a DSLAM simulator. If it turns out in the test that the subscriber's modem cannot communicate with the simulator associated to it, but the DSLAM can, is shown that the DSLAM is operative, and that the defect must be at the subscriber's side. Such a test can be carried out without sending staff to the DSLAM, if the two simulators and remote-controlled relays for establishing the required connections are present at the DSLAM. The use of this technology therefore requires considerable investment.

SUMMARY OF THE INVENTION

The object of the present invention is to provide a novel method for testing a bi-directional communication interface such as a xDSL modem which is economic to implement and which is suitable for execution under remote control.

The object is achieved by a method for testing a bi-directional communication interface comprising a transmitter and a receiver connected to a same port for connecting to a transmission line, wherein a) the transmitter is amplitude controlled to emit a test signal in a first frequency range at a first amplitude, and a first amplitude of a signal in a second frequency range received at the same time at the receiver is detected, b) the transmitter is controlled to emit the test signal at a second amplitude different from the first and a second amplitude of the signal received at the same time at the receiver is detected, and c) based on the first and second amplitudes of the received signal, the interface is judged to be in order or not in order.

It should be noted that steps a) and b) can be carried out in any order.

The invention is based on the idea that in such a bi-directional communication interface, the signal from the transmitter reaches the receiver with an amplitude which exceeds that of a signal received from another communication interface at the remote end of the transmission line by several tens of decibels, so that the signal from this remote interface is discernible at the receiver only if extreme efforts are undertaken to prevent the transmitter from generating noise in the second frequency range.

If the transmitter is heavily damaged, so that it does not transmit at all or only generates noise, or if the receiver is dead, the amplitude detected by the receiver will always be the same, regardless of how the transmitter is driven. If the transmitter is only slightly damaged, so that it can still emit a signal, but the amount of noise it generates is increased, this can also be detected. Accordingly, there are various ways in which the general idea of the invention may be implemented.

According to a first preferred embodiment the amplitudes of the test signal are selected such that at the first amplitude the transmitter is expected not to generate noise in the second frequency range, whereas at the second amplitude of the test signal it is expected to do so. Step c) then comprises the steps c1) of comparing the difference amount between the first and second amplitudes of the received signal to a given limit and c2) of judging the interface to be out of order if the difference amount is below a given limit. In this case, if the difference amount is less than expected, there is a high probability that either the transmitter is dead or that it generates excessive noise at any amplitude, or that the receiver is dead. In any of these cases, the interface must be judged to be out of order.

It should be noted, of course, that when it is said that the transmitter "does not generate noise", this can not mean that no noise exists, but is only a shorter way of saying that the power level of the noise is below a certain threshold so that it does not disturb the operation of the communication interface.

If the difference amount between the first and second amplitudes of the received signal is above the given limit, this does not yet necessarily imply that the interface is in order. Preferably the test procedure continues by reducing the second amplitude and repeating steps b) and c1) until the difference amount is below the given limit, and the interface is judged to be out of order if the thus obtained second amplitude is below a predetermined limit which corresponds to a maximum amplitude at which the transmitter should be able to operate without generating excessive noise in the second frequency range.

Alternatively, if the difference amount between the first and second amplitudes of the received signal is above the given limit, the test procedure continues by increasing the first amplitude and repeating steps b) and c1) until the difference amount is below the given limit, and the interface is judged to be out of order if the thus obtained first amplitude is below a predetermined limit.

According to a third embodiment, at the first amplitude of the test signal the transmitter is expected not to generate noise in the second frequency range, but no assumption need be made about the second amplitude. In this case, if the difference between first and second amplitudes of the received signal is below a given limit, the second amplitude of the test signal is increased, and steps b) and c1) are repeated until either the second amplitude has reached a predefined maximum level or the difference amount is above the given limit, and the interface is judged to be out of order if the thus obtained second amplitude is below a predetermined limit, i.e. if the transmitter begins to generate excessive noise at an unexpectedly low amplitude level.

Conversely, the second amplitude of the test signal may be selected so that the transmitter is expected to generate noise at the second frequency whereas no assumption need be made about the first amplitude of the test signal. In this case, if the difference between the first and second amplitudes of the received signal is below a given limit, the first amplitude of the test signal is decreased and steps a) and c1) are repeated until either the first amplitude has reached a predefined minimum level, which may be 0, or the difference amount is above the given limit, and the interface is judged to be out of order if the thus obtained first amplitude is above a predetermined limit.

In order to facilitate distinguishing noise from the transmitter from other signal components in the received signal, the test signal preferably has a plurality of discrete spectral components, and the frequency of the received signal is a sum or a difference of the frequencies of the spectral components of the test signal. If the transmitter exhibits non-linear behaviour, i.e. if frequency-mixing occurs between the spectral components of the test signal, noise will result at this sum or difference frequencies.

In order to separate these frequencies from other types of noise (for the purposes of the method of this invention, noise does not only include crosstalk from adjacent modems and transmission lines but also any signals from the remote modems), filtering techniques such as synchronous averaging may be used.

In order to find a defect in the interface before it becomes serious enough to affect data communication, the above described steps a) to c) should be repeated periodically.

According to a preferred application of the method, the interface is a xDSL subscriber line interface, and the test signal is a DMT signal.

The DMT signal may comprise at least one carrier modulated with payload data, because for carrying out the method of the invention, it is not necessary to interrupt data communication by the subscriber line.

The interface which is tested by the above-described methods may be a subscriber's premises interface, connected to the telephone line on the one hand and to a subscriber's terminal, on the other. Preferably the method is applied to an interface between the telephone line and a communication network, and it further comprises the step d) of transmitting a message indicating one of the first and second amplitudes of the received signal, the difference between these two amplitudes and the result of the judgement to a central station of the communication network, where information about the status of various interfaces connected to the network may be gathered in order to coordinate maintenance operations.

The interface may carry out the above described test method autonomously, without requiring an external trigger signal. However, the interface should also be adapted to carry out above steps a) to d) when it receives a trigger command from the central station of the network. In this way, when a subscriber notifies the central station of communication problems, a test may be carried out at once under remote control, and a subscriber can be informed of the results, so that he either knows for sure that the problem is caused by his own equipment and that it is his responsibility to solve it, or that the problem is on the network side and the network operator will take care of it.

A modem for carrying out the method of the invention comprises the interface, a port for connecting the interface to a transmission line, and control means for causing the transmitter to transmit the test signal at said first and second amplitudes and for detecting first and second amplitudes of the signal received by the receiver while transmitting said test signal. Means for determining the difference between the first and second amplitudes of the received signal or for carrying out the judgement might be provided in the central station, preferably they are provided in the modem in order to keep the amount of messages exchange between the modem and the central station small.

Further features and advantages of the invention will become apparent from the subsequent description of embodiments thereof referring to the drawings.

BRIEF DESCRIPTION OF THE DRAWINGS

FIG. 3 is a flowchart of a test method executed by the network side modem of FIG. 2.

DESCRIPTION OF EMBODIMENTS

Figure 1:
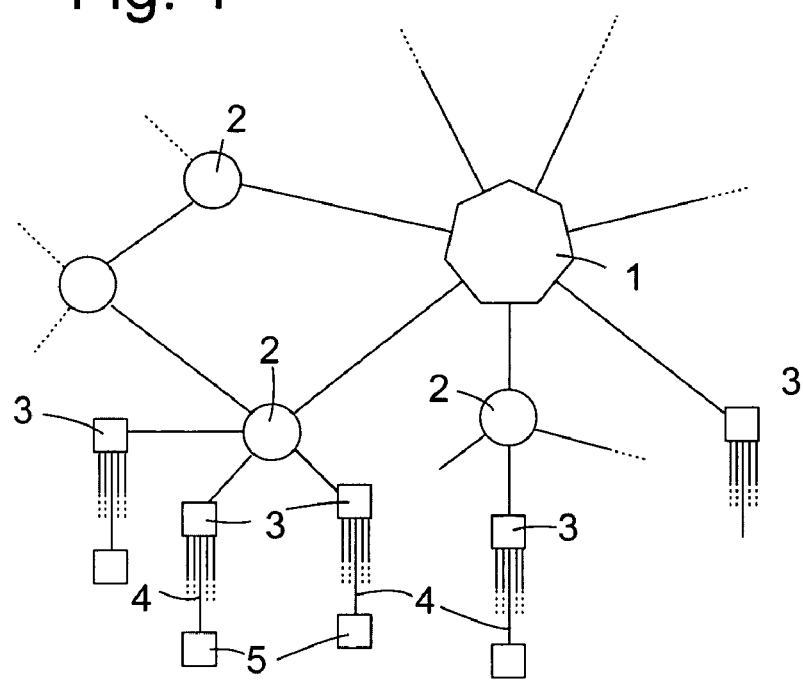
FIG. 1 is a block diagram of a telecommunication network in which the invention is applicable.

FIG. 1 is a block diagram of an IP network comprising a central node 1 and a plurality of secondary nodes 2, to which DSL access multiplexers (DSLAMs) 3 are connected. The DSLAMs 3 provide access to the IP network and to a telephony network, not shown, to subscribers who have terminals 5 connected to them by telephone lines 4. Each DSLAM 3 has several telephone lines 4 connected to it and serves several subscribers.

Figure 2:
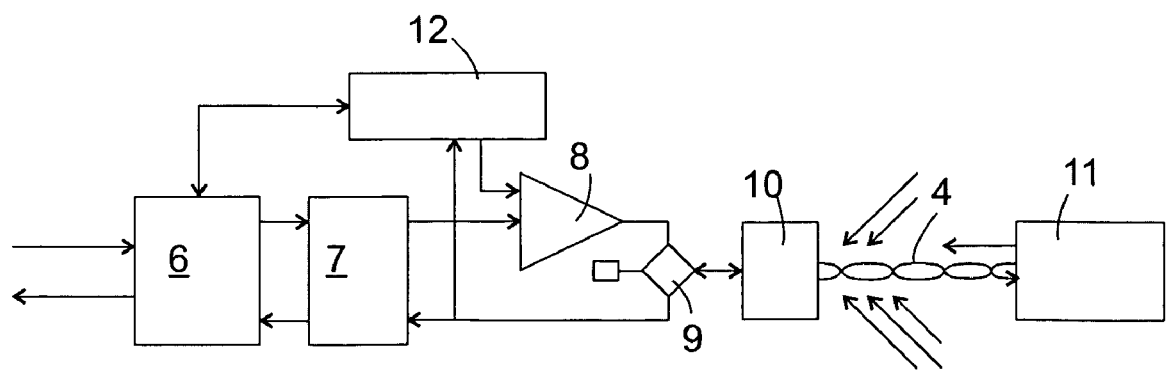
FIG. 2 is a block diagram illustrating a network side modem, a subscriber's modem and a subscriber line connecting the two.

A DSLAM, shown schematically in FIG. 2, comprises a digital signal processor 6 which receives from the network data packets intended for a subscriber associated to it and outputs data packets into the network. The DSP communicates with a so-called analog front-end circuit 7, which converts digital data it receives from DSP 6 into analog downlink signals of a form suitable for transmission on the telephone line 4 and supplies these to a line driver 8 in order to be amplified. Conventionally, these downlink signals are a DMT signal comprising a plurality of carriers at various frequencies in a downlink frequency range, on which the digital data are modulated.

A hybrid circuit 9 has an input port connected to the output of line driver 8, an output port connected to an input of analog front-end 7, and a bi-directional port connected to a telephone line 4 via a high pass filter 10. Analog front end 7, line driver 8 and hybrid circuit 9 may be regarded as a modem of the DSLAM 3. At the remote end of the telephone line 4, there is a subscriber's modem 11. Since all these components and their functions are familiar to the skilled person, they need not be explained in greater detail here.

A remarkable feature of the DSLAM is controller 12, which is connected to the DSP 6, to the line driver 8, and to the output port of hybrid circuit 9. An example of an operating procedure of controller 12 is described referring to the flowchart of FIG. 3.

In the first step S1 of the procedure the controller 11 waits for a test command to trigger the execution of a test procedure. The test command may be generated by an internal timer of the DSLAM modem 3 itself, or it may be received from central node 1 via the network. The central node 1 may issue such tests commands to the DSLAMs 3 connected to the network at regular time intervals, in which case an internal timer of the modem is not necessary, or it may issue the test command at arbitrary times upon instruction from an operator, e.g. when the operator receives a complaint from a subscriber that his terminal can not communicate properly.

When such a command is received, the controller proceeds to step S2 and sets the amplitude of the signal emitted by line driver 8 to a value A1 where it is expected to operate linearly, i.e. where the generation of a signal by the line driver 8 in a downlink frequency range is not accompanied by generation of noise in an uplink frequency band reserved for transmission from the subscriber to the network, so that an uplink signal from the subscriber's terminal 11 is not concealed by noise from the line driver 8 although it is strongly attenuated in subscriber line 4.

The amplitude A1 set by controller 12 in step S2 may be zero, but preferably it is positive and high enough that payload data modulated on the various carriers of the DMT signal used as a test signal for the present test procedure can be decoded at the subscriber's side.

The test procedure can therefore be carried out at any time, regardless of whether data are being transmitted to the subscriber at the same time or not.

While transmitting the test signal at said first amplitude A1, a measurement of the noise intensity received at the receiver port of front-end circuit 7 is carried out in step S3. Various sources contribute to the signal that arrives at this receiver port. There may be payload signals from the subscriber equipment 11, crosstalk which is coupled into the subscriber line 4 from adjacent lines connected to the same DSLAM, and noise from the line driver, which is directly transmitted through hybrid circuit 9 to the receiver port. Since the DMT signal emitted by line driver 8 has a spectrum formed of discrete lines, the noise it generates also has a discrete spectrum, the lines of which are at sum and difference frequencies of the lines of the DMT signal. For carrying out the measurement of step S3, such a sum or difference frequency component is extracted from the broadband signal at the receiver port by synchronous averaging. The intensity E1 of this selected component is recorded by control circuit 12. At this time, it is not known how much of the intensity E1 is indeed due to noise from line driver 8, and how much originates from crosstalk, signals from the subscriber's modem 11, etc.

In a next step S4, the control circuit 12 sets the output amplitude of line driver 8 to a high level A2 at which harmonic distortion is expected to occur, and simultaneously, the intensity E2 at the selected frequency is measured again. i.e. while in step S3 the measured intensity E1 is expected to originate from other noise sources than the line driver 8, in step S3, E2 should have a significant contribution from the line "driver 8".

If desired, steps S2 to S5 may be repeated a predetermined number of times, and average values calculated from the intensities E1, E2 measured in steps S3 and S5, respectively, in order to improve their reliability.

In step S6, control circuit 12 calculates the difference $(\Delta)=E2-E1$ between the intensities measured in steps S3 and S5. In step S7, the difference .DELTA. is compared to a predetermined threshold $(\Delta)_1$. If $(\Delta)$ is below the threshold, the reason might be that the line driver 8 is destroyed, so that it transmits no signal at all, or that the receiver part of front-end circuit 7 is destroyed, so that a signal arriving at its receiver port is not detected. In either case, the DSLAM is found defective, and a message to this effect is transmitted to the central station in step S8, so that staff may be sent to repair the DSLAM 3.

If $\Delta$ is found to be above the threshold $\Delta_1$ in step S7, the control circuit 11 proceeds to step S9, in which a new output amplitude level A2 for line driver 8 is determined, which is slightly less than that of step S4. The line driver 8 is set to this new output amplitude in step S10, and the resulting signal intensity E2 at the selected frequency at the receiver port is determined in step S11. $\Delta=E2-E1$ is recalculated (S12), and the new $\Delta$ is compared to threshold $\Delta_1$ again in step S13. If $\Delta$ is still above $\Delta_1$, the procedure returns to step S9. If $\Delta$ is found to be less than the threshold $\Delta_1$ in S13, the amplitude A2 set in step S10 is compared to a second threshold $A_{min}$ in step S14. If the amplitude A2 is above the second threshold $A_{min}$, the line driver 8 can be operated at sufficiently high amplitudes without a serious degradation of the uplink signal by noise from the line driver 8, and it is decided that the modem of DSLAM 3 is in order (S15). If the set amplitude is below the threshold $A_{min}$, it can be concluded that harmonic distortions begins already at rather low signal amplitudes, and that line driver 8 is defective (S16). The defect is not necessarily serious enough to prevent data communication over subscriber line 4 altogether, it may even not yet be noticeable for the subscriber. It is not necessary, therefore, to repair the defect at once, but it is advisable to repair it, when repair staff happens to be in the neighbourhood of the concerned modem, in order to prevent the defect from aggravating and becoming noticeable for the subscriber.

Of course, the procedure described above is only exemplary, and there are various possible alternatives to it. According to a first alternative, steps S1 to S8 are the same as described above, but steps S9 to S11 are replaced by increasing the lower one A1 of the two amplitudes A1, A2, output it and measuring the resulting intensity E1 at the receiver port. Steps S13 to S16 are those of FIG. 3 again. Here the modem is found to be defective if in step S14, A1 is above a threshold $A_{max}$.

According to another alternative procedure, at first, the line driver 8 is set to emit the test signal at a first, low amplitude A1 at which the output signal is expected to be free from harmonic distortion. Then, successively higher output levels A2 of the line driver are set, and the difference $\Delta = E2-E1$ between signal intensities E1, E2 measured at the receiver port at the initial low amplitude A1 and the subsequent higher ones A2 are compared to the threshold $\Delta_1$. The amplitude A2 where harmonic distortion is observed for the first time is recorded and compared to a predetermined threshold $A_{min}$. If it is higher than $A_{min}$, the modem is determined to be in order; if it is below the threshold, there must be damaged parts in it.

Of course, the testing methods described above might also be carried out in the subscriber modem. In this case, the test command of step S1 would have to be generated automatically by the subscriber's equipment or input by the subscriber, and the steps S8, S15, S16 in which messages are transmitted to the central station should be replaced by steps of displaying appropriate messages on a display of the subscriber's equipment.

The invention claimed is:

1. A method for testing a bidirectional communication interface including a transmitter and a receiver in an analogue front-end of a modem, comprising:
    transmitting a first test signal in a first frequency range with a first amplitude, from the transmitter of the modem;
    detecting, at the receiver of the modem, a signal in a second frequency range with a first amplitude;
    transmitting a second test signal in a first frequency range with a second amplitude, from the transmitter of the modem;
    detecting, at the receiver of the modem, a signal in a second frequency range with a second amplitude; and
    determining a difference value based on the first and second amplitudes of the detected signals by a controller.

2. The method of claim 1, further including:
    comparing the difference value between the first and second amplitudes of the detected signals to a determined threshold; and
    determining the interface is out of order based on the comparison being below the determined threshold.

3. The method of claim 2, further including:
    reducing the second amplitude of the second test signal if the difference value is above the determined threshold;
    repeating the transmitting step of the second test signal with the reduced second amplitude, the detecting step, the determining step, the comparing step, the determining step, and the reducing step, until the difference value is below the determined threshold; and
    determining the communication interface is out of order based on the reduced second amplitude being below a second determined threshold.

4. The method of claim 1, further including:
    increasing the second amplitude of the test signal when the difference value is under a determined threshold;
    repeating the previous steps until either the increased second amplitude has reached a determined maximum level or the difference value is above the determined threshold;
    determining the interface is out of order based on the increased second amplitude being below a second determined threshold.

5. The method of claim 1, further including:
    decreasing the first amplitude of the first test signal when the difference value is under a determined threshold;
    repeating the previous steps until either the decreased first amplitude has reached a predefined minimum level or the difference value is above the determined threshold;
    determining the interface is out of order based on the decreased first amplitude being below a predetermined limit.

6. The method of claim 1, wherein the test signal has a plurality of discrete spectral components.

7. The method of claim 6, wherein the frequency of the detected signals is a sum or a difference of the frequencies of the spectral components of the test signal.

8. The method of claim 7, wherein the detected signals are obtained by synchronous averaging.

9. The method of claim 2, further including:
    repeating the steps periodically.

10. The method of claim 2, wherein the communication interface is a xDSL subscriber line interface, and the first and second test signals are DMT signals.

11. The method of claim 10, wherein the DMT signals include at least one carrier modulated with payload data.

12. The method of claim 10, further including:
    transmitting a message indicating one of the first and second amplitudes of the detected signals, the difference value, and the result of the determining the interface is out of order, to a central station of a communication network, wherein the communication interface is between a subscriber line and the communication network.

13. The method of claim 12, further including:
    sending a trigger command to perform the transmitting and detecting steps, from the central station of the network to said interface.

14. A modem for testing a bidirectional communication interface, comprising:
    a transmitter in an analogue front-end port connecting to a transmission line;
    a receiver in the analogue front-end port connecting to a transmission line;
    a controller configured to control the transmitter to transmit test signals in a first frequency range and at first and second amplitudes and configured to control the receiver to detect signals in a second frequency range and having first and second amplitudes and determine a difference value based on the difference between the first and second amplitudes.

15. The modem of claim 14, wherein the modem is a xDSL access multiplexer.

* * * * *